US005913607A

United States Patent [19]

Lengyel, Sr.

[11] Patent Number: 5,913,607

[45] Date of Patent: Jun. 22, 1999

[54] FIREPROOF CONTAINER

[76] Inventor: Edward A. Lengyel, Sr., 7130 Liberty Rd., Solon, Ohio 44139

[21] Appl. No.: 08/991,400

[22] Filed: Dec. 16, 1997

Related U.S. Application Data

[60] Provisional application No. 60/033,082, Dec. 16, 1996.

[51] Int. Cl.[6] .................. B65D 33/24

[52] U.S. Cl. .................. 383/84; 383/86; 383/110

[58] Field of Search .................. 383/84, 86, 86.1, 383/86.2, 110

[56] References Cited

U.S. PATENT DOCUMENTS

| | | | |
|---|---|---|---|
| 2,022,251 | 11/1935 | Mallay | 383/110 X |
| 2,087,611 | 7/1937 | Wells, Jr. et al. | 383/110 X |
| 2,257,517 | 9/1941 | Spotts | 383/110 X |
| 3,066,847 | 12/1962 | Fortune | 383/110 X |
| 3,082,713 | 3/1963 | Elgin | 383/110 X |
| 3,637,000 | 1/1972 | Walger et al. | 383/110 X |
| 4,580,683 | 4/1986 | Gochenour | 383/84 X |
| 5,061,086 | 10/1991 | Vallerga | 383/86.2 X |

*Primary Examiner*—Jes F. Pascua
*Attorney, Agent, or Firm*—Pearne, Gordon, McCoy & Granger LLP

[57] ABSTRACT

A heat resistant container has a flexible pouch-like configuration and is fabricated using a laminate assembly of conventional heat resistant fabric materials and assembly techniques. The laminate assembly includes outer layers of woven silica fiber fabric enclosing a non-woven fabric of a ceramic fiber. The containers may be provided in a variety of sizes for most household applications and convenient storage.

11 Claims, 3 Drawing Sheets

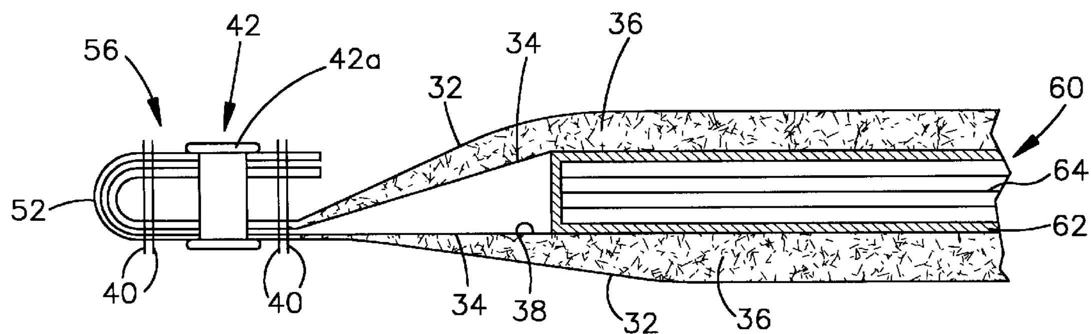
Fig.2
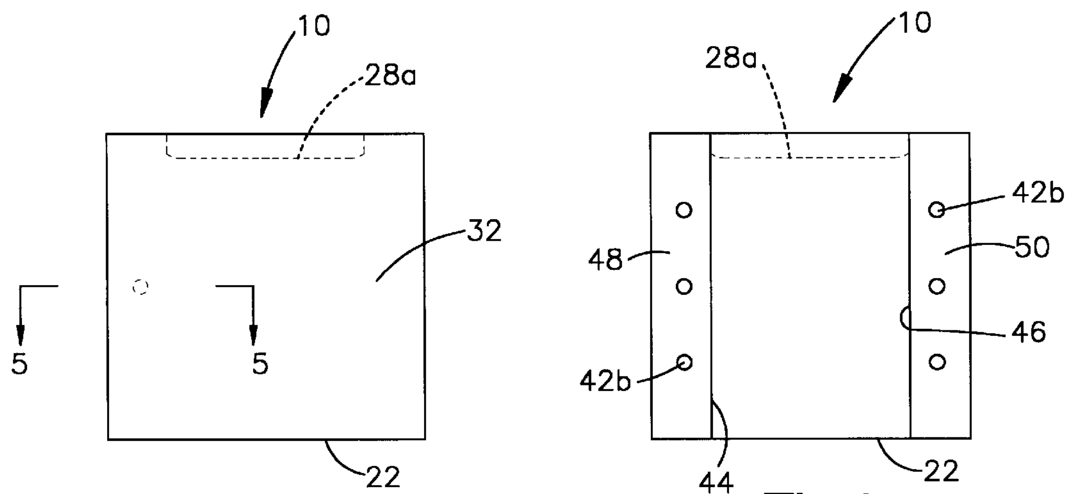
Fig.3
Fig.4
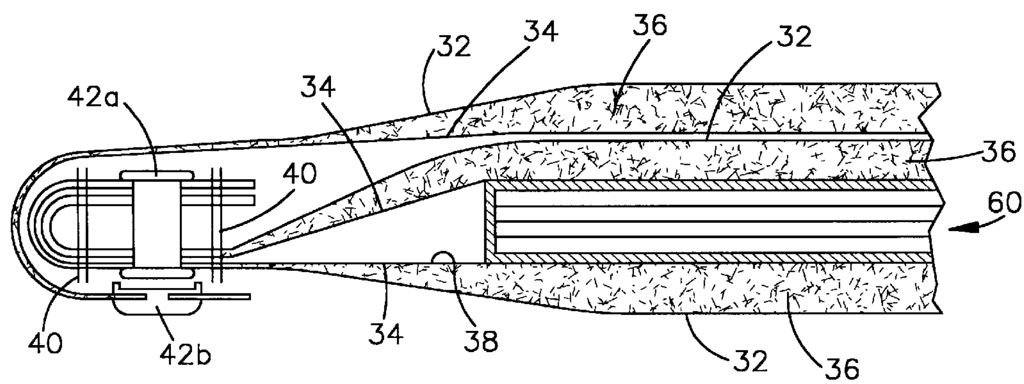
Fig.5

FIREPROOF CONTAINER

BACKGROUND OF THE INVENTION AND RELATED ART

This application claims the benefit of U.S. Provisional Application No. 60/033,082, filed Dec. 16, 1996.

The present invention relates to heat resistant containers and, more particularly, economical heat resistant containers that provide protection against fire and associated high temperature conditions and to methods of making the same. The containers are particularly suitable for storage of important documents as well as other valued items such as keepsake photographs and the like, and they are especially useful for providing fire and heat resistant household storage of such items.

A variety of fireproof safes and other security structures are available for industrial applications. These typically comprise large, heat-insulated and metal reinforced constructions that are quite costly. Scaled-down models of such fireproof safes are also available for household or residential use. However, these constructions remain sufficiently costly to inhibit their wide spread use. Although safe deposit boxes with fireproof storage conditions may be rented at banks and other institutions, these are not convenient and often do not provide an economic alternative.

SUMMARY OF THE INVENTION

As indicated, a heat resistant container that is inexpensive and lends itself to household use is provided. The container has a flexible pouch-like construction that may be fabricated using conventional heat resistant fabric materials and assembly techniques. The containers may be provided in a variety of sizes for most household applications and convenient storage.

The container has a pouch portion extending in a longitudinal direction to a flap portion that is movable between open and closed positions. More particularly, the flap portion is pivotable along a transverse fold line between the pouch and flap portions to open and close the pouch or container. The flap portion has a proximal end adjacent the fold line and a remote distal end. The pouch portion has a pouch pocket having an opening at the fold line adjacent the proximal end of the flap portion and, upon pivotable closing movement, the flap portion extends across and closes the pouch opening. The flap portion includes laterally projecting flap ears extending along the side edges thereof for enclosing the lateral side edges of the pouch portion when the flap portion is in the closed position to enhance resistance to heat transfer and inhibit flame access into the closed pouch. In addition, the pouch portion has an inwardly folded pouch pleat extending along each of the lateral side edges thereof that is covered by the closed flap portion to further enhance the heat and flame resistance characteristics of the container.

The container is constructed with a laminate wall assembly including opposed flexible fabric sheets enclosing flexible insulation. The flexible fabric sheet comprises a high temperature resistant woven fabric sheet formed of an inorganic material such as glass or refractory silica fiber. The flexible insulation may comprise a temperature resistant non-woven fabric sheet disposed between the woven fabric sheets. The non-woven fabric sheet may also be formed of inorganic fiber, alumina-silica ceramic fiber being preferred. The flexible insulation may also include a metallic foil which may be reinforced. In addition to providing heat and flame insulating properties, the foil also provides a liquid barrier to protect the container contents from inadvertent liquid exposure and from intentionally applied liquids such as fire fighting fluids.

BRIEF DESCRIPTION OF THE DRAWINGS

FIG. 2 is a diagrammatic, fragmentary sectional view on an enlarged scale taken along the line 2—2 in FIG. 1;

FIG. 3 is an elevational view on a reduced scale showing the container of FIG. 1 in a closed condition as viewed from the flap side;

FIG. 4 is an elevational view similar to FIG. 3 showing the container as viewed from the pouch side;

FIG. 5 is a diagrammatic, fragmentary sectional view on an enlarged scale taken along the line 5—5 in FIG. 3.

DETAILED DESCRIPTION OF THE DRAWINGS

Figure 1:
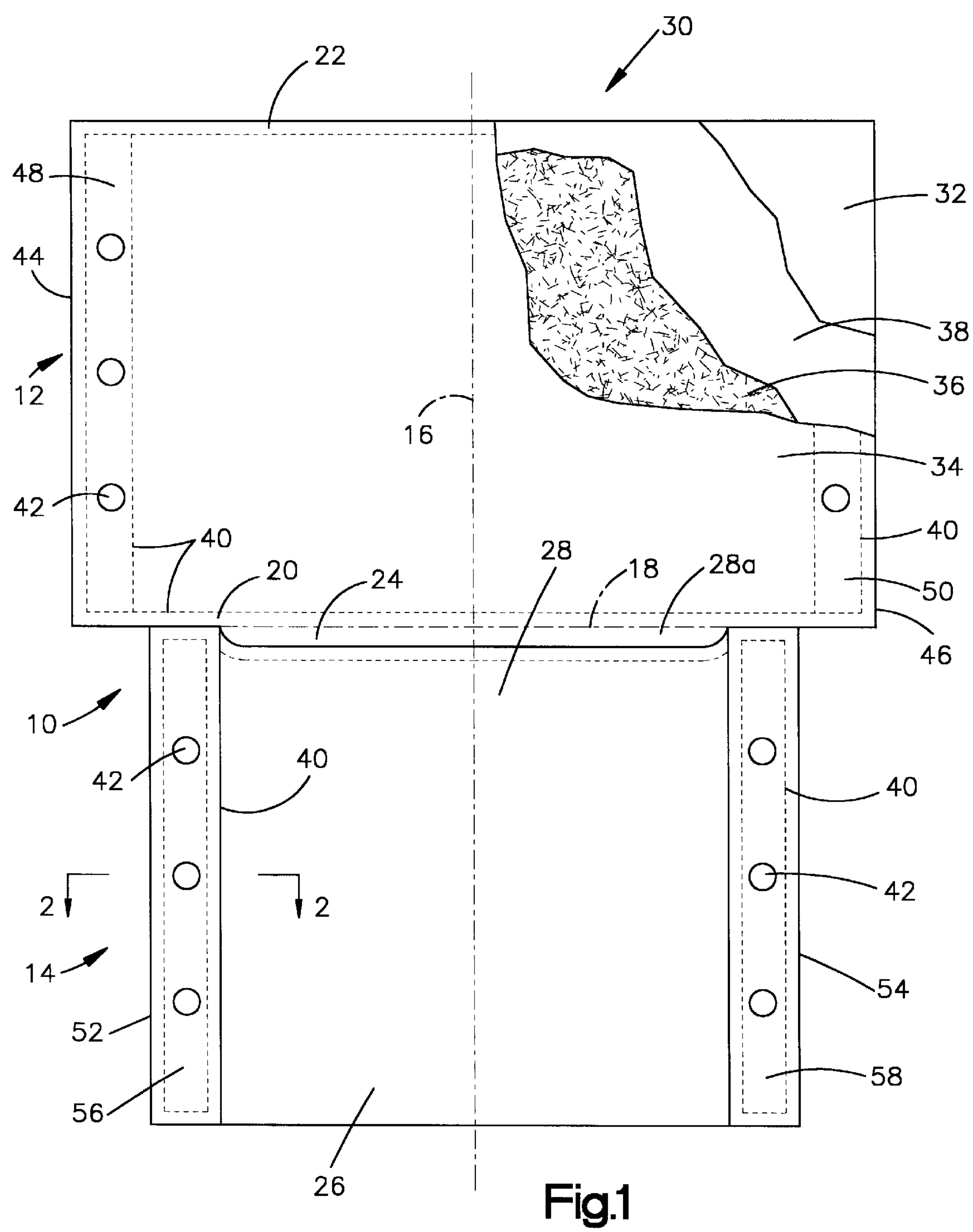
FIG. 1 is a plan view with parts broken away of a container in accordance with the invention in an open condition.

Referring to FIG. 1, there is shown a container 10 in an open condition. The container 10 includes a flap portion 12 and a pouch portion 14. The container 10 has a longitudinal axis 16 and a transverse or laterally extending fold line or pivot axis 18 located between the flap and pouch portions.

The flap portion 12 includes a proximal end 20 disposed adjacent the fold line 18 and a distal end 22 remote of the fold line 18. The pouch portion 14 includes a proximal end 24 adjacent the fold line 18 and a distal end 26 remote of the fold line 18. The pouch portion 14 provides a pouch pocket 28 having a pouch opening 28 adjacent the fold line 18.

The container 10 is formed of a flexible laminate assembly 30 most clearly shown in connection with the flap portion 12. The assembly 30 includes opposed, substantially coextensive outer woven fabric sheets 32 and 34 disposed in overlying relationship and having a non-woven fabric sheet 36 enclosed therebetween. As described more fully below, the fabric sheets are high temperature resistant, non-flammable and provide heat insulation properties. The assembly 30 may also include at least one metallic foil sheet 38 disposed between the sheets 32 and 34. The sheet 38 may be adhesively secured to the woven or non-woven sheets. A pair of metallic foil sheets 38 may be used, one be adhered to each side of the non-woven sheet 36. The sheet 38 provides further resistance to heat transfer and flammability as well as a liquid barrier.

The woven fabric sheets 32 and 34 are formed of high temperature resistant, non-flammable fiber material such glass, silica or refractory silica, and other known materials, all referred to herein as inorganic materials or fibers. A preferred woven fabric sheet is sold by Alpha Associates, Inc. of New Jersey under the designation Alpha-Sil 600. The Alpha-Sil 600 fabric is formed of refractory silica fibers and its weave is designated as 8-harness satin. The fabric has been found to be of suitable flexibility and hand comfort at a weight of 18.0 oz./sq. yd. and a thickness of 0.030". The Alpha-Sil 600 fabric has a rated temperature resistance of 1800° F. and a melt temperature of 3000° F.

The non-woven fabric 36 is also formed of high temperature resistant, non-flammable fiber material such as those the inorganic fibers noted above. A preferred fabric is sold under the designation K-LITE by Engineered Thermal Systems, Inc. of Streetsboro, Ohio. This is a silica ceramic fiber bat having a thickness of about 0.5", a continuous use temperature rating of 2,300° F. and a melt temperature of 3,300° F.

The metallic foil sheet 38 is conventionally available for high temperature pipe wrapping or the like. The foil sheet may be reinforced with a mesh support grid.

As,shown in FIG. 1, the sheets 36 and 38 do not extend to the perimeter or extremities of the sheets 32 and 34, and they may be positioned with the use of adhesives or tape products. For example, 3M Super Spray 77 adhesive supplied by Minnesota Mining and Manufacturing Company of St. Paul, Minn. has been found to provide good results.

The flap portion 12 of the container is provided by overlying portions of the laminate assembly 30 as best shown in FIG. 2. In this manner, the materials to be protected by the pouch are enclosed within at least a double layer of the laminate assembly 30. In addition, it should be appreciated that the pouch opening 28 is protected by the flap portion 12 and the laminate assembly 30 thereof when the flap portion is moved to the closed position.

The assembly 30, or at least the sheets 32 and 34 thereof, are secured together about at least portions of their perimeters by adhesive or stitching 40 as shown in FIG. 1. The stitching 40 may be provided by conventional sewing techniques used for glass, silica or other inorganic fiber constructions. In this regard, a high temperature sewing thread such as Alpha-Maritex Style S-110-3 , Kevlar/Stainless steel wire thread also distributed by Alpha Associates, Inc. of New Jersey.

In addition to the stitching 40, the sheets 32 and 34 are secured together with interengaging mechanical fasteners 42, or more particularly, male components 42*a* or female components 42*b* of the fasteners 42. Referring to FIG. 2, the male component 42*a* secures the longitudinal edges of the pouch portion 14 together. Similarly, the longitudinal edges of the flap portion 12 are secured together by the female components 42*b* as shown in FIG. 5. Accordingly, the fasteners 42 or components thereof are used as mechanical clasps.

The stitching 40 may also surround and enclose the mechanical fastener components 42*a* and 42*b*. The insulation sheets 36 and 38 terminate prior to the stitching 40, that is, the sheets 36 and 38 are inboard of the stitching 40. The sheets 36 and 38 may be positioned relative to the outer sheets 32 and 34 by adhesive or double sided tape. In addition, stitching 40 may be provided along the fold line 18 with penetration of the sheets 36 and 38 to better fix the latter relative to the outer woven sheets 32 and 34.

Referring to FIG. 1, the flap portion 12 includes side edges 44 and 46 extending longitudinally along the lateral extremities or width thereof. Laterally projecting flap ears 48 and 50 are provided adjacent the side edges 44 and 46 of the flap portion 12. As indicated above, the flap ears 48 and 50 may comprise only the overlying perimeter portions of the sheets 32 and 34.

Referring to FIGS. 1 and 2, the pouch portion 14 includes side edges 52 and 54 extending longitudinally along the lateral extremities or width thereof. The pouch portion 14 includes opposed pouch pleats 56 and 58 extending along the side edges 52 and 54. Each pouch pleat 56 and 58 comprises a lateral perimeter portion of the overlying sheets 32 and 34 folded inwardly onto itself to result in an edge construction comprising eight layers of the woven fabric sheets 32 and 34. As particularly shown in FIG. 2, the pleats 56 and 58 are secured together by the stitching 40 and the male components 42*a* of the fasteners 42.

Referring to FIG. 3, the container 10 is shown in the closed position with the flap portion 12 pivoted about the fold line 18 to a position overlying the pouch portion 14. In addition, the flap ears 48 and 50 are folded about the associated side edges 52 and 54 of the pouch portion 14, and the fasteners 42 are interengaged by joining the male components 42*a* with the female components 42*b* as shown in FIG. 4.

Referring to FIG. 5, the closure of the container 10 by the fasteners 42 is shown. (For clarity of illustration, the thickness dimension is exaggerated and the elements are shown in spaced apart relationship.) The edge extremities of the sheets 32 and 34 forming the pouch portion 14 are enclosed within the overlying flap portion 12 and surrounded by the flap ears 48 and 50. In this manner, the lateral sides of the pouch portion 14 are provided with enhanced heat resistance and flame resistance at the side edges of the pouch portion where the extremities of the sheets 32 and 34 are joined.

Referring to FIGS. 2 and 5, an organizer 60 is positioned within the pouch portion 14, or more particularly, the pouch pocket 28. The organizer 60 may be of conventional paper or cellulosic or plastic reinforced construction having a thicker gauge outer enclosure 62 and a plurality of dividers. The pocket 28 has a depth and a width slightly greater than the corresponding height and width of the organizer 60 so that the latter is fully received within the pocket and protected. The container 10 may be manufactured in a variety of sizes to accommodate commercially available organizers of different sizes.

Figure 6:
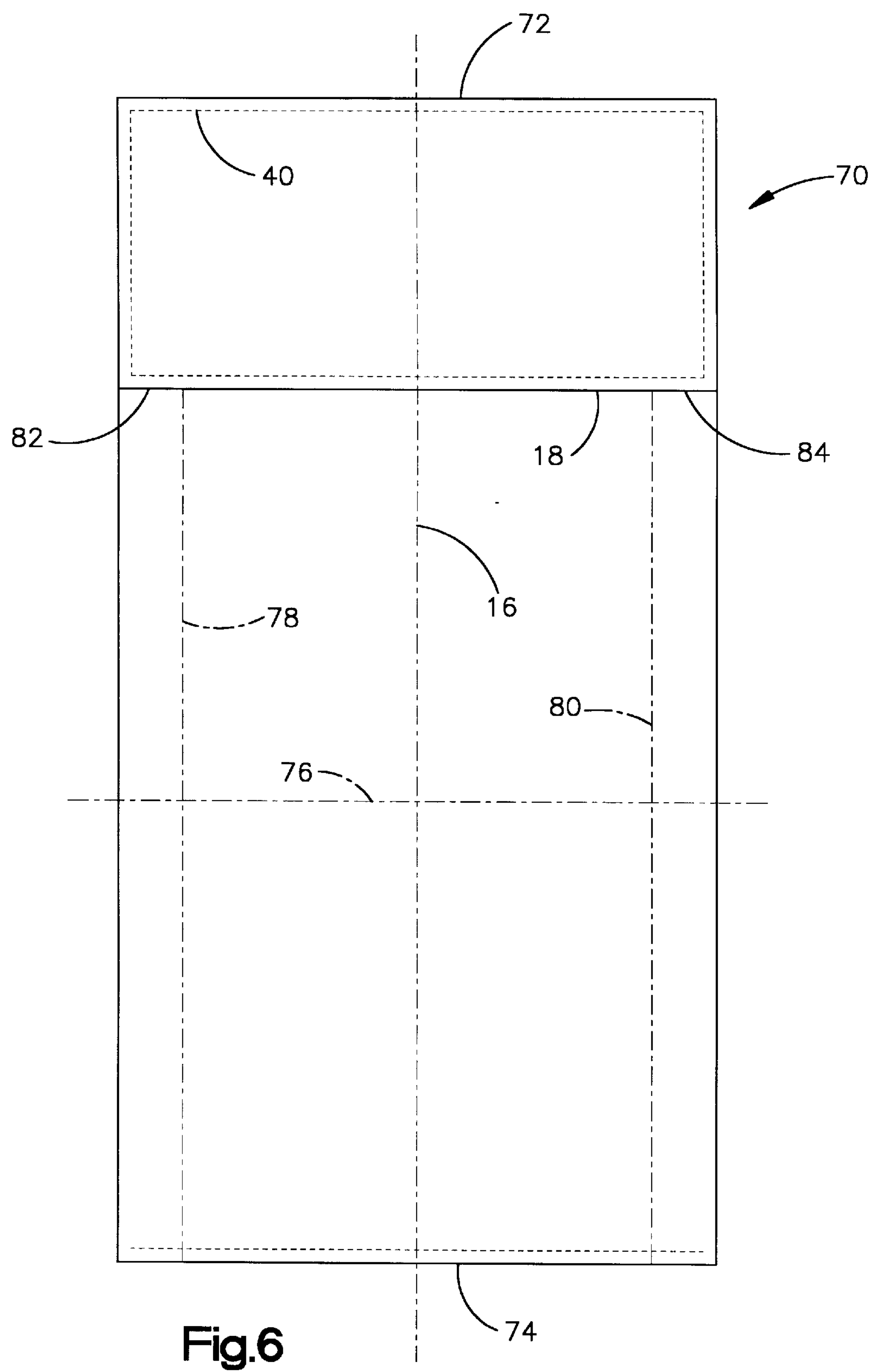
FIG. 6 is a plan view on a reduced scale showing container stock comprising an assembly of sheet materials in overlying position for fabrication to form the container of FIG. 1.

A preferred technique for providing containers in accordance with the invention is shown with reference to the laminate container stock 70 shown in FIG. 6. For convenience, the conversion of the container stock 70 into a container in accordance with the invention is described with respect to the fabrication of the container 10.

The stock 70 has been constructed to correspond with the structure of the laminate assembly 30 and cut to size for making a container 10. To that end, the stock 70 has a generally rectangular shape, a longitudinal dimension about three times the height or depth of the container 10 and a width or lateral dimension corresponding with the flap portion 12 of the container 10. The fold line 18 is shown relative to the stock 70, the longitudinal extent of the stock above the fold line 18 corresponding with the flap portion 12 and the longitudinal extent below the fold line 18 corresponding with the pouch portion 14 prior to pouch formation.

The stock 70 has a flap end 72, a pouch end 74, a transverse construction fold line 76, and a pair of longitudinal pleat fold lines 78 and 80. The flap end 72 and pouch end 74 may be sewn closed by stitching 40 along the respective ends.

The pouch portion 14 is provided by folding the stock 70 along the construction fold line 76 to dispose the pouch end 74 adjacent the fold line 18. Transverse cuts 82 and 84 extend inwardly from each longitudinal edge along the fold line 18 to permit the stock 70 to be folded inwardly and form the pouch pleats 56 and 58. After the pleats 56 and 58 have been formed, the male fastener components 42*a* may be installed and the pleats may be sewn to enclose the fastener components in the same manner as shown in FIG. 1. Similarly, the flap portion 12 is sewn to provide the stitching 40 as shown in FIG. 1 and the female fastener components 42*b* are installed. In all cases, the order of the sewing and fastener installation steps may be altered.

The above method is preferred since it utilizes continuous expanses of sheet materials to form the container. It also reduces the number of exposed stock edges in the final container and provides increased layers of stock along the pouch edges including a continuous and full thickness layer of enclosed insulation extending across the pouch opening. Further, the pouch opening is closed by the flap portion and better sealed with the flap ears connected to the reverse side of the pouch and container.

The container 10 constructed as described above using Alpha-Sil 600 fabric to form the sheets 32 and 34, K-Lite non-woven fabric at ½" thickness to form the sheet 36 and Alpha-Maritex Style S-110-3 fireproof thread to provide the indicated stitching together with the above described mechanical fasteners was tested in an outdoor wood fire intended to simulate a residence fire. For test purposes, an organizer of paper construction of the type sold by The Smead Manufacturing company of Hastings, Minn. was placed in the pouch pocket of the container. The organizer contained conventional correspondence or typing paper materials and photographs. The container was closed by snapping the mechanical fastener components together.

The fire was made using 2×4 lumber and miscellaneous wood in an amount sufficient to sustain a bed of hot flaming red coals beneath the over burning lumber and wood. After achieving a sustained fire and burning condition, the closed container was placed on the coals of the fire in an effort to impose maximum temperature. The container remained in the fire for a period of 20 minutes and, during that time period, additional wood was added to the fire to maintain the overburning flames and flaming bed of red coals.

Thereafter, the container was removed from the fire and inspected following air cooling. The woven fabrics were smoke and charcoal/ash stained, but did not show signs of combustion or fiber melting. The edges of the organizer, papers and photographs adjacent the pouch opening showed limited charring or singing, but they were otherwise maintained.

I claim:

1. A heat resistant flexible container having a pouch portion extending in a longitudinal direction to a flap portion movable between open and closed positions, said pouch and flap portions having lateral side edges, said flap portion being pivotable along a fold line extending transversely between said pouch and flap portions to open and close said pouch, said flap portion having a proximal end adjacent said fold line and a distal end remote of said fold line, said pouch portion having a pouch opening at said fold line adjacent said proximal end of said flap portion, said flexible container including a laminate wall assembly having opposed flexible fabric sheets enclosing flexible insulation forming said pouch and flap portions, said flexible fabric sheet comprising a high temperature resistant woven fabric sheet, said flexible insulation comprising a temperature resistant non-woven fabric sheet disposed between said woven fabric sheets, said flap portion having flap ears projecting from its lateral side edges for enclosing said lateral side edges of said pouch portion in said closed position, said flexible fabric sheets have perimeters and being secured together along at least portions of their perimeters by first and second closing means, said second closing means also operating to openably secure said flap portion in said closed position.

2. A container as in claim 1, wherein said first closing means comprises stitching and said second closing means comprises mechanical clasp fasteners.

3. A container as in claim 2, wherein said mechanical clasp fasteners comprise male and female components of interengaging mechanical fasteners.

4. A container as in claim 1, wherein said woven fabric sheet comprises a silica fabric and said non-woven fabric comprises a ceramic fabric.

5. A container as in claim 1, wherein said pouch portion includes at least two overlying layers of said laminate wall assembly.

6. A container as in claim 5, wherein said container has a width extending in the transverse direction of said fold line, said pouch portion has opposed side edges that each extend in a direction perpendicular to said fold line, each side edge comprising an inwardly folded edge pleat with the extremities of said laminate wall assembly being disposed below said flap in said closed position.

7. A container as in claim 1, wherein said pouch portion encloses organizer means for separating items placed in the pouch portion.

8. A container as in claim 1, wherein said laminate wall assembly also includes a metallic foil layer disposed between said woven fabric sheets.

9. A container as in claim 1, wherein said pouch and flap portions are formed of a single continuous piece of said laminate wall assembly that is folded along said fold line.

10. A container as in claim 1, wherein said first closing means comprises stitching and said second closing means comprises frictionally engagable mechanical fasteners.

11. A container as in claim 10, wherein said mechanical fasteners comprise snap fasteners.

* * * * *